(12) United States Patent
Pinkerton

(10) Patent No.: US 10,354,102 B2
(45) Date of Patent: Jul. 16, 2019

(54) ULTRASONIC IDENTIFICATION DEVICES AND METHODS OF MAKING AND USING SAME

(71) Applicant: Clean Energy Labs, LLC, Austin, TX (US)

(72) Inventor: Joseph F. Pinkerton, Austin, TX (US)

(73) Assignee: CLEAN ENERGY LABS, LLC, Austin, TX (US)

(*) Notice: Subject to any disclaimer, the term of this patent is extended or adjusted under 35 U.S.C. 154(b) by 526 days.

(21) Appl. No.: 15/191,821

(22) Filed: Jun. 24, 2016

(65) Prior Publication Data
US 2016/0379018 A1    Dec. 29, 2016

Related U.S. Application Data

(60) Provisional application No. 62/185,431, filed on Jun. 26, 2015.

(51) Int. Cl.
| | | |
|---|---|---|
| G06K 7/00 | (2006.01) | |
| H04B 11/00 | (2006.01) | |
| G06K 7/02 | (2006.01) | |
| G06K 19/067 | (2006.01) | |

(52) U.S. Cl.
CPC ........... G06K 7/02 (2013.01); G06K 19/0672 (2013.01); H04B 11/00 (2013.01)

(58) Field of Classification Search
USPC .......................................................... 367/2
See application file for complete search history.

(56) References Cited

U.S. PATENT DOCUMENTS

| | | | | |
|---|---|---|---|---|
| 9,100,754 | B1* | 8/2015 | Pinkerton | H04R 19/02 |
| 9,143,868 | B2* | 9/2015 | Pinkerton | H04R 7/02 |
| 9,167,353 | B2* | 10/2015 | Pinkerton | H04R 19/02 |
| 9,264,795 | B2* | 2/2016 | Pinkerton | H04R 1/283 |
| 9,264,796 | B2* | 2/2016 | Pinkerton | H04R 1/283 |
| 9,313,580 | B2* | 4/2016 | Pinkerton | H04R 7/02 |
| 9,516,426 | B2* | 12/2016 | Pinkerton | H04R 7/02 |
| 9,661,422 | B2* | 5/2017 | Pinkerton, III | H04R 19/02 |
| 9,826,313 | B2* | 11/2017 | Pinkerton | H04R 1/02 |
| 10,194,244 | B2* | 1/2019 | Pinkerton | H04R 7/02 |
| 2004/0000843 | A1* | 1/2004 | East | F04B 43/046 310/331 |
| 2007/0215224 | A1* | 9/2007 | Furukawa | F04B 43/043 137/833 |
| 2008/0245985 | A1* | 10/2008 | Heim | F16K 99/0001 251/129.06 |
| 2008/0248275 | A1* | 10/2008 | Jang | B82Y 30/00 428/220 |
| 2009/0052699 | A1* | 2/2009 | Andersen | H04R 17/02 381/173 |
| 2009/0166067 | A1* | 7/2009 | Iwai | B32B 15/016 174/257 |
| 2010/0183180 | A1* | 7/2010 | Tsai | H04R 1/2826 381/338 |
| 2012/0000293 | A1* | 1/2012 | Baughman | H02N 1/006 73/861.08 |

(Continued)

*Primary Examiner* — James R Hulka
(74) *Attorney, Agent, or Firm* — Dickinson Wright PLLC; Ross Spencer Garsson

(57) ABSTRACT

Ultrasonic identification devices, and methods of making and use same. The present invention further relates to ultrasonic ID devices using membranes (such as membranes made of graphene or a polyester film).

9 Claims, 6 Drawing Sheets

(56) References Cited

U.S. PATENT DOCUMENTS

| | | | |
|---|---|---|---|
| 2012/0308415 A1* | 12/2012 | Pinkerton | F04B 43/043 417/413.1 |
| 2014/0037126 A1* | 2/2014 | Pinkerton | H04R 7/02 381/396 |
| 2015/0098595 A1* | 4/2015 | Pinkerton | H04R 7/02 381/191 |
| 2015/0208174 A1* | 7/2015 | Pinkerton | H04R 19/02 381/165 |
| 2015/0208175 A1* | 7/2015 | Pinkerton | H04R 19/02 381/165 |
| 2015/0208177 A1* | 7/2015 | Pinkerton | H04R 1/283 381/396 |
| 2015/0208178 A1* | 7/2015 | Pinkerton | H04R 1/283 381/396 |
| 2016/0007124 A1* | 1/2016 | Pinkerton | H04R 19/02 381/191 |
| 2016/0309259 A1* | 10/2016 | Pinkerton | H04R 7/02 |

\* cited by examiner

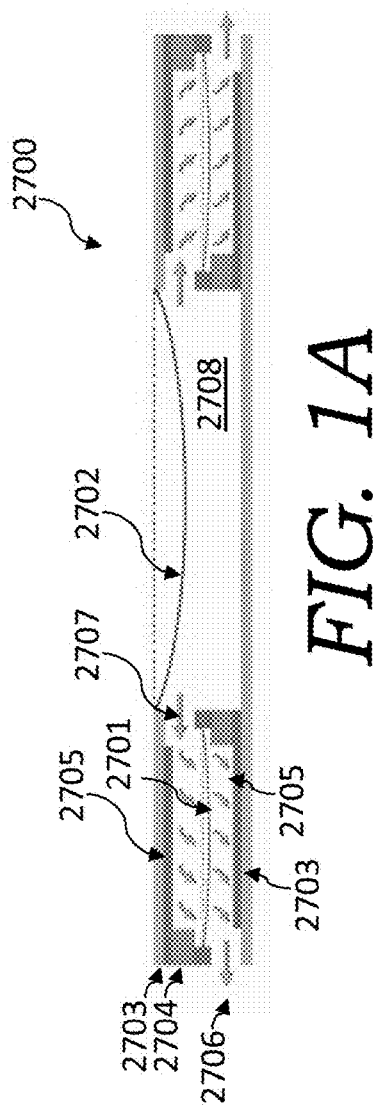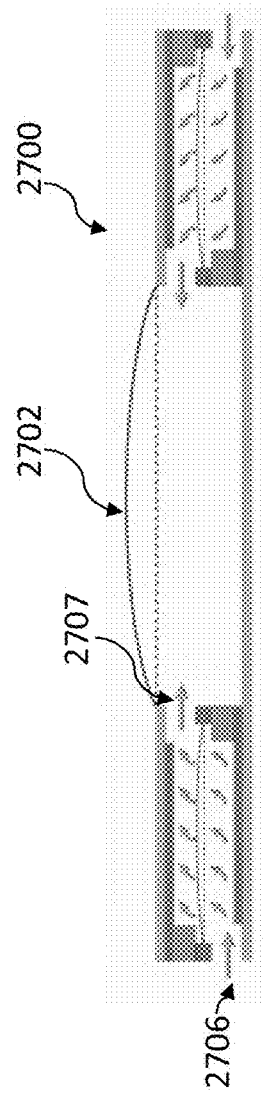
FIG. 1A
FIG. 1B

ULTRASONIC IDENTIFICATION DEVICES AND METHODS OF MAKING AND USING SAME

RELATED PATENT APPLICATIONS

This application claims priority to provisional U.S. Patent Application Ser. No. 62/185,431 filed on Jun. 26, 2015, entitled "Ultrasonic Identification Devices And Methods Of Making And Using Same."

TECHNICAL FIELD

The present invention relates to ultrasonic identification (ultrasonic ID) devices, and methods of making and use same. The present invention further relates to ultrasonic ID devices using membranes (such as membranes made of graphene or a polyester film).

BACKGROUND

A radio frequency identification (RFID) device is an object that can be applied to or incorporated into a product, animal, or person for the purpose of identification and tracking using radio waves. Some RFID devices can be read from several meters away and beyond the line of sight of the reader. Generally, in the prior art, an RFID device (also called an RFID tag) contains at least two parts. One is an integrated circuit for storing and processing information, modulating and demodulating a radio-frequency (RF) signal, and other specialized functions. The second is an antenna for receiving and backscattering the signal. There are generally two types of RFID devices: an active RFID device, which contains a battery or some other power source, and a passive RFID device, which have no such battery or other power source. Today, RFID devices are used in many uses, such as supply chain management to improve the efficiency of inventory tracking and management.

RFID devices are often too large for the intended use and also cost prohibitive. Accordingly, there is a need for a smaller and less expensive option for RFID devices.

SUMMARY OF THE INVENTION

Applicants have discovered ultrasonic ID devices that utilize membrane drums (such as graphene drums or drums made of a polyester film (like Mylar)). Then ultrasonic devices generate the desired ultrasonic sound by the use of pressurized airflow due to the movement of the membrane drums. The signals can be tuned so that they have a unique (and identifiable resonant frequency).

In general, in one aspect, the invention features an ultrasonic identification device that includes a substrate. The ultrasonic identification device further includes a plurality of membranes located on the substrate. The membranes include a substance selected from the group consisting of graphene, graphene oxide, polyester films, polymer films, and combinations thereof. The ultrasonic identification device further includes a material feature deposited on one side of each of the membranes in the plurality of membranes to form a plurality of weighted membrane drums. The plurality of the weighted membrane drums are operable to resonate in response to a first ultrasonic sound signal. The resonance of the plurality of the weighted membrane drums is operable to produce a second ultrasonic sound signal.

Implementations of the inventions can include one or more of the following features:

The substance can include a polyester film.

The polyester film can be polyethylene terephthalate film.

The substance can include a polymer film that includes a polymer selected from the group consisting of polyethylene terephthalate, polyethylene, polypropylene, polyvinyl chloride, polydimethylsiloxane, and combinations thereof.

The material feature can include a material selected from the group consisting of metal, plastic, polyester, and a combination thereof.

The material feature can include metal.

The plurality of weighted membrane drums can includes at least five weighted membrane drums.

The resonance of each of the plurality of weighted membrane drums can be operable to produce different membrane ultrasonic sound signals within the second ultrasonic sound signal.

The first weighted membrane drum and the second weighted membrane drum in the plurality of weighted membrane drums can be operable to produce different membrane ultrasonic sound signals within the second ultrasonic sound signal due to a characteristic selected from the group consisting of (a) a difference of diameter of the material feature on the first weighted membrane drum and the material feature on the second weighted membrane drum, (b) a difference of thickness of the material feature on the first weighted membrane drum and the material feature on the second weighted membrane drum, (c) a difference of density of the material feature on the first weighted membrane drum and the material feature on the second weighted membrane drum, (d) a difference of thickness of the membrane of the first weighted membrane drum and the membrane of the second weighted membrane drum, (e) a difference in the pre-tension of the membrane of the first weighted membrane drum and the membrane of the second weighted membrane drum, (f) a difference in the diameter of the of the membrane of the first weighted membrane drum and the membrane of the second weighted membrane drum, (g) a difference in the treatment of the membrane of the first weighted membrane drum and the membrane of the second weighted membrane drum, (h) a difference in the additives added to the membrane of the first weighted membrane drum and the membrane of the second weighted membrane drum, and (i) combinations thereof.

In general, in another aspect, the invention features a method of manufacturing an ultrasonic identification device. The method includes selecting a substrate. The method further includes locating a plurality of membranes on the substrate. The membranes include a substance selected from the group consisting of graphene, graphene oxide, polyester films, polymer films, and combinations thereof. The method further includes depositing a material feature on one side of each of the membranes in the plurality of membranes to form a plurality of weighted membrane drums. The plurality of the weighted membrane drums are operable to resonate in response to a first ultrasonic sound signal. The resonance of the plurality of the weighted membrane drums is operable to produce a second ultrasonic sound signal.

Implementations of the inventions can include one or more of the following features:

The substance can include a polyester film.

The polyester film can be polyethylene terephthalate film.

The substance can include a polymer film that includes a polymer selected from the group consisting of polyethylene terephthalate, polyethylene, polypropylene, polyvinyl chloride, polydimethylsiloxane, and combinations thereof.

The material feature can include a material selected from the group consisting of metal, plastic, polyester, and a combination thereof.

The material feature can include metal.

The plurality of weighted membrane drums can include at least five weighted membrane drums.

The resonance of each of the plurality of weighted membrane drums can be operable to produce different membrane ultrasonic sound signals within the second ultrasonic sound signal.

The first weighted membrane drum and the second weighted membrane drum in the plurality of weighted membrane drums can be operable to produce different ultrasonic sound signals due to a characteristic selected from the group consisting of (a) a difference of diameter of the material feature on the first weighted membrane drum and the material feature on the second weighted membrane drum, (b) a difference of thickness of the material feature on the first weighted membrane drum and the material feature on the second weighted membrane drum, (c) a difference of density of the material feature on the first weighted membrane drum and the material feature on the second weighted membrane drum, (d) a difference of thickness of the membrane of the first weighted membrane drum and the membrane of the second weighted membrane drum, (e) a difference in the pre-tension of the membrane of the weighted membrane drum and the membrane of the second weighted membrane drum, (f) a difference in the diameter of the of the membrane of the first weighted membrane drum and the membrane of the second weighted membrane drum, (g) a difference in the treatment of the membrane of the first weighted membrane drum and the membrane of the second weighted membrane drum, (h) a difference in the additives added to the membrane of the first weighted membrane drum and the membrane of the second weighted membrane drum, and (i) combinations thereof.

The method can further include tuning at least one of the weighted membrane drums in the plurality of weighted membrane drums so that the tuned weighed membrane drum is operable to produce a pre-determined ultrasonic sound signal.

The method can further include heat treating at least some of the weighted membrane drums in the plurality of membrane drums to tune the treated weighted membrane drums to pre-determined resonant frequencies.

The step of heat treating can include the use of a laser or flash lamp.

In general, in another aspect, the invention features a method of using an ultrasonic identification device. The method includes selecting an ultrasonic identification device including a plurality of membrane drums. The method further includes receiving a first ultrasonic sound signal, wherein the plurality of the membrane drums resonate in response to the first ultrasonic sound signal. The method further includes producing a second ultrasonic sound signal based upon the resonance of the plurality of the membrane drums.

Implementations of the inventions can include one or more of the following features:

The method can further include receiving the second ultrasonic sound signal. The method can further include using the received second ultrasonic sound signal to identify the ultrasonic identification device.

A second device can be used to receive the second ultrasonic signal and to identify the ultrasonic identification device.

The second device can be used to transmit the first ultrasonic sound signal.

The second device can be a cell phone.

The second device can be a computer.

The weighted membrane drums can each include a membrane that includes a substance selected from the group consisting of graphene, graphene oxide, polyester films, polymer films, and combinations thereof.

The substance can include a polyester film.

The polyester film can be polyethylene terephthalate film.

The substance can include a polymer film that includes a polymer selected from the group consisting of polyethylene terephthalate, polyethylene, polypropylene, polyvinyl chloride, polydimethylsiloxane and combinations thereof.

The plurality of membrane drums can be a plurality of weighted membrane drums.

The weighted membrane drums can each include a material feature that includes a material selected from the group consisting of metal, plastic, polyester, and a combination thereof.

The plurality of weighted membrane drums can include at least five weighted membrane drums.

The resonance of each of the plurality of membrane drums can be operable to produce different membrane ultrasonic sound signals within the second ultrasonic sound signal.

The first membrane drum and the second membrane drum in the plurality of membrane drums are operable to produce different membrane ultrasonic sound signals within the second ultrasonic sound signal due to a characteristic selected from the group consisting of (a) a difference of diameter of a first material feature on the first membrane drum and a second material feature on the second membrane drum, (b) a difference of thickness of the first material feature on the first membrane drum and the second material feature on the second membrane drum, (c) a difference of density of the first material feature on the first membrane drum and the second material feature on the second membrane drum, (d) a difference of thickness of the membrane of the first membrane drum and the membrane of the second membrane drum, (e) a difference in the pre-tension of the membrane of the membrane drum and the membrane of the second membrane drum, (f) a difference in the diameter of the of the membrane of the first membrane drum and the membrane of the second membrane drum, (g) a difference in the treatment of the membrane of the first membrane drum and the membrane of the second membrane drum, (h) a difference in the additives added to the membrane of the first membrane drum and the membrane of the second membrane drum, and (i) combinations thereof.

In general, in another aspect, the invention features an ultrasonic identification device that includes a substrate. The ultrasonic identification device further includes a plurality of membranes located on the substrate. The membranes include a substance selected from the group consisting of graphene, graphene oxide, polyester films, polymer films, and combinations thereof. The plurality of the membrane drums are operable to resonate in response to a first ultrasonic sound signal. The resonance of the plurality of the membrane drums is operable to produce a second ultrasonic sound signal. A first membrane drum and a second membrane drum in the plurality of membrane drums are operable to produce different membrane ultrasonic sound signals within the second sound signal due to a characteristic selected from the group consisting of (a) a difference of thickness of the membrane of the first membrane drum and the membrane of the second weighted membrane drum, (b)

a difference in the pre-tension of the membrane of the first membrane drum and the membrane of the second membrane drum, (c) a difference in the diameter of the of the membrane of the first membrane drum and the membrane of the second membrane drum, (d) a difference in the treatment of the membrane of the first membrane drum and the membrane of the second membrane drum, (e) a difference in the additives added to the membrane of the first membrane drum and the membrane of the second membrane drum, and (f) combinations thereof.

Implementations of the inventions can include one or more of the following features:

The substance can include a polyester film.

The polyester film can be polyethylene terephthalate film.

The substance can include a polymer film that includes a polymer selected from the group consisting of polyethylene terephthalate, polyethylene, polypropylene, polyvinyl chloride, polydimethylsiloxane, and combinations thereof.

The plurality of membrane drums can include at least five membrane drums.

The resonance of each of the plurality of membrane drums can be operable to produce different membrane ultrasonic sound signals within the second ultrasonic sound signal.

In general, in another aspect, the invention features a method of manufacturing an ultrasonic identification device. The method includes selecting a substrate. The method further includes locating a plurality of membranes on the substrate. The membranes include a substance selected from the group consisting of graphene, graphene oxide, polyester films, polymer films, and combinations thereof. The plurality of the membrane drums are operable to resonate in response to a first ultrasonic sound signal. The resonance of the plurality of the membrane drums is operable to produce a second ultrasonic sound signal. A first membrane drum and a second membrane drum in the plurality of membrane drums are operable to produce different membrane ultrasonic sound signals within the second sound signal due to a characteristic selected from the group consisting of (a) a difference of thickness of the membrane of the first membrane drum and the membrane of the second weighted membrane drum, (b) a difference in the pre-tension of the membrane of the first membrane drum and the membrane of the second membrane drum, (c) a difference in the diameter of the of the membrane of the first membrane drum and the membrane of the second membrane drum, (d) a difference in the treatment of the membrane of the first membrane drum and the membrane of the second membrane drum, (e) a difference in the additives added to the membrane of the first membrane drum and the membrane of the second membrane drum, and (f) combinations thereof.

Implementations of the inventions can include one or more of the following features:

The substance can include a polyester film.

The polyester film can be polyethylene terephthalate film.

The substance can include a polymer film that includes a polymer selected from the group consisting of polyethylene terephthalate, polyethylene, polypropylene, polyvinyl chloride, polydimethylsiloxane, and combinations thereof.

The plurality of membrane drums can include at least five membrane drums.

The resonance of each of the plurality of membrane drums can be operable to produce different membrane ultrasonic sound signals within the second ultrasonic sound signal.

DESCRIPTION OF DRAWINGS

FIGS. 1A-1E (which are reproduced from Pinkerton '715 Application) depict an electrically conductive membrane pump/transducer that utilizes an array of electrically conductive membrane pumps that cause a membrane to move in phase. FIGS. 1A-1B depict cross-section views of the pump/transducer. FIGS. 1C-1E depict overhead views of the pump/transducer.

DETAILED DESCRIPTION

The present invention relates to ultrasonic identification (ultrasonic ID) devices and methods for making and using same. The present invention further relates to devices that include membrane drums operable for producing the ultrasonic sound.

Graphene membranes (also otherwise referred to as "graphene drums") have been manufactured using a process such as disclosed in Lee et al. Science, 2008, 321, 385-388. PCT Patent Appl. No. PCT/US09/59266 (Pinkerton) (the "PCT US09/59266 Application") described tunneling current switch assemblies having graphene drums (with graphene drums generally having a diameter between about 500 nm and about 1500 nm). PCT Patent Appl. No. PCT/US11/55167 (Pinkerton et al.) and PCT Patent Appl. No. PCT/US11/66497 (Everett et al.) further describe switch assemblies having graphene drums. PCT Patent Appl. No. PCT/US11/23618 (Pinkerton) (the "PCT US11/23618 Application") described a graphene-drum pump and engine system.

Figure 1C:
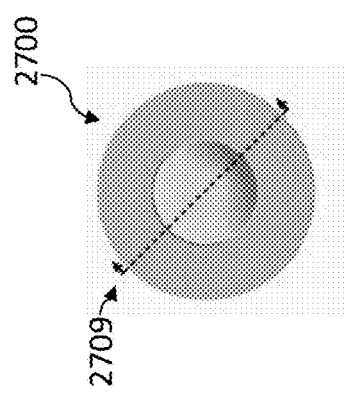

FIGS. 1A-1E are figures that have been reproduced from FIGS. 1A-1E of U.S. patent application Ser. No. 14/717,715, filed on May 20, 2015 (the "Pinkerton '715 Application") Pinkerton '715 Application. As set forth in the Pinkerton '715 Application:

FIGS. 1A-1E depict an electrically conductive membrane pump/transducer 2700 that utilizes an array of electrically conductive membrane pumps that cause a membrane 2702 to move in phase. FIGS. 1A-1B are cross-sectional views of the pump/transducer that includes electrically conductive members 2701 (in the electrically conductive membrane pumps) and a speaker membrane 2702. Speaker membrane 2702 can be made of a polymer, such as polydimethylsiloxane ("PDMS"). Each of the electrically conductive membrane pumps has a membrane 2701 that can deflect toward downward and upwards. Traces 2605 are a metal (like copper, tungsten, or gold). The electrically conductive membrane pumps also have a structural material 2703 (which can be plastic, FR4 (circuit board material), or Kapton® polyimide film (DuPont USA)) and support material 2704 that is an electrical insulator (like oxide, FR4, or Kapton® polyimide film). Support material 2704 can be used to support the pump membrane, support the stator and also serve as the vent structure. Integrating these functions into one element makes device 2700 more compact than it would be with multiple elements performing these functions. All of the non-membrane elements shown in FIG. 1A-1E can be made from printed circuit boards or die stamped sheets, which enhances manufacturability.

Arrows 2706 and 2707 show the direction of fluid flow (i.e., air flow) in the pump/transducer 2700. When the electrically conductive membranes 2701 are deflected downward (as shown in FIG. 1A), air will flow out of the pump/transducer device 2700 (from the electrically conductive membrane pumps) as shown by arrows 2706. Air will also flow from the cavity 2708 into the electrically conductive membrane pumps as shown by arrows 2707 resulting in speaker membrane 2702 moving downward. When the electrically conductive membranes 2701 are deflected upwards (as shown in FIG. 1B), air will flow into the pump/transducer device 2700 (into the electrically conductive membrane pumps) as shown by arrows 2706. Air will also flow into the cavity 2708 from the electrically conductive membrane pumps as shown by arrows 2707 resulting in speaker membrane 2702 moving upward.

Figure 1E:
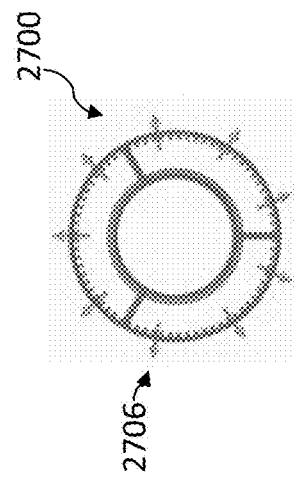
Figure 1D:
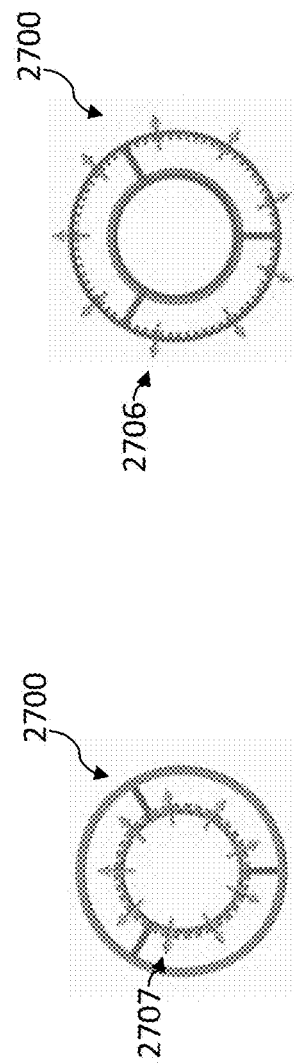

FIG. 1C is an overhead view of pump/transducer device 2700. Line 2709 reflects the cross-section that is the viewpoint of cross-sectional views of FIGS. 1A-1B. FIGS. 1D-1E shows the flow of air (arrows 2707 and 2706, respectively) corresponding to the deflection downward of electrically conductive membranes 2701 and speaker membrane 2702 (which is shown in FIG. 1A). The direction of arrows 2707 and 2706 in FIGS. 1D-1E, respectively, are reversed when the deflection is upward (which is shown in FIG. 1B).

The basic operation for pump/transducer 2700 is as follows. A time-varying stator voltage causes the pump membranes 2701 to move and create pressure changes within the speaker chamber 2708. These pressure changes cause the speaker membrane 2702 to move in synch with the pump membranes 2701. This speaker membrane motion produces audible sound.

U.S. Pat. No. 8,778,197 (Everett et al.) ("Everett '197 Patent") (incorporated herein) teaches a process by which a patterned material may be controllably fashioned on the membrane. FIGS. 2A-2J (which are from Everett '197 Patent) depict a scheme for patterning a material (e.g., another metal such as Au) in a controlled fashion on the suspended graphene window on a supported metal foil. This process includes a step of patterning and depositing the material on one side of the graphene-modified foil and then doing an aligned etch of the metal away from beneath the patterned feature.

Figures 2A, 2B, 2C, 2D, 2E, 2F, 2G, 2H, 2I, 2J:
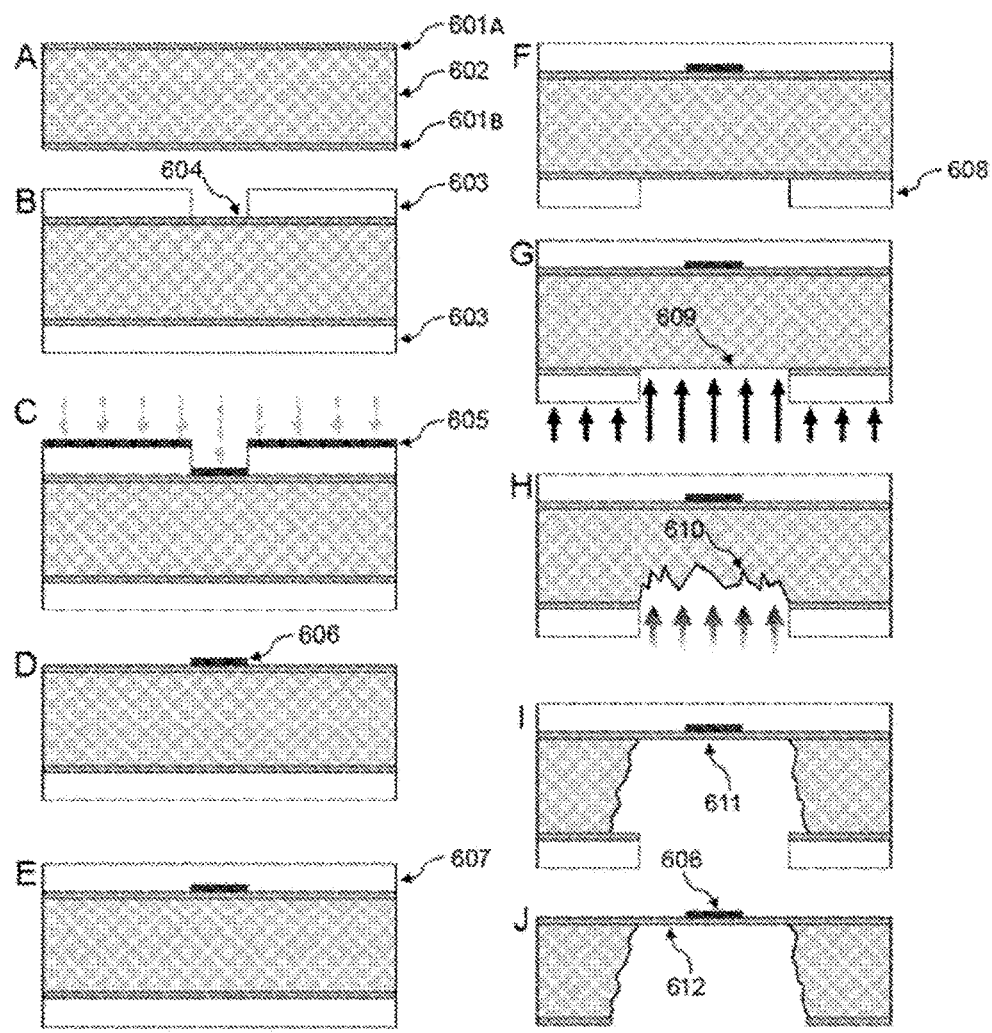
FIGS. 2A-2J (which is reproduced from Everett '197 Patent) depict a scheme for patterning a material (e.g., another metal such as Au) in a controlled fashion on the suspended graphene window on a supported metal foil. This feature is on the opposite face of the graphene as the metal support foil.

As shown in FIG. 2A, graphene (graphene 601A and graphene 601B) is grown (e.g., via CVD) on both sides of clean, pre-annealed metal foil 602 (e.g., Cu). As shown in FIG. 2B, photoresist 603 is spin-coated on both sides of the graphene-modified foil and photolithographically is used to define a deposition region 604.

As shown in FIG. 2C, material 605 (e.g., polymer, metal) is deposited onto the patterned region 604 (e.g., via electroplating or chemical bonding) or deposited uniformly onto the entire surface (e.g., thermal or E-beam evaporation). As shown in FIG. 2D, a lift-off process is performed to define the patterned feature 606. As shown in FIG. 2E, protective polymer 607 (e.g., photoresist) is spin-coated atop patterned feature 606.

As shown in FIG. 2F, a process is performed to align and photolithographically pattern photoresist 608 on the backside of the graphene-modified foil. As shown in FIG. 2G, an etching process (dry or wet) is utilized to etch away graphene 601B in exposed region 609 of the polymer. As shown in FIGS. 2H and 2I, the metal foil 602 is etched 610 through the patterned photoresist until the opposite graphene surface 611 of the graphene 601A is reached. As shown in FIG. 2J, the photoresist is dissolved and polymer residue is rinsed, which leaves behind suspended graphene window 612 with patterned material feature 606 atop it.

Figure 3:
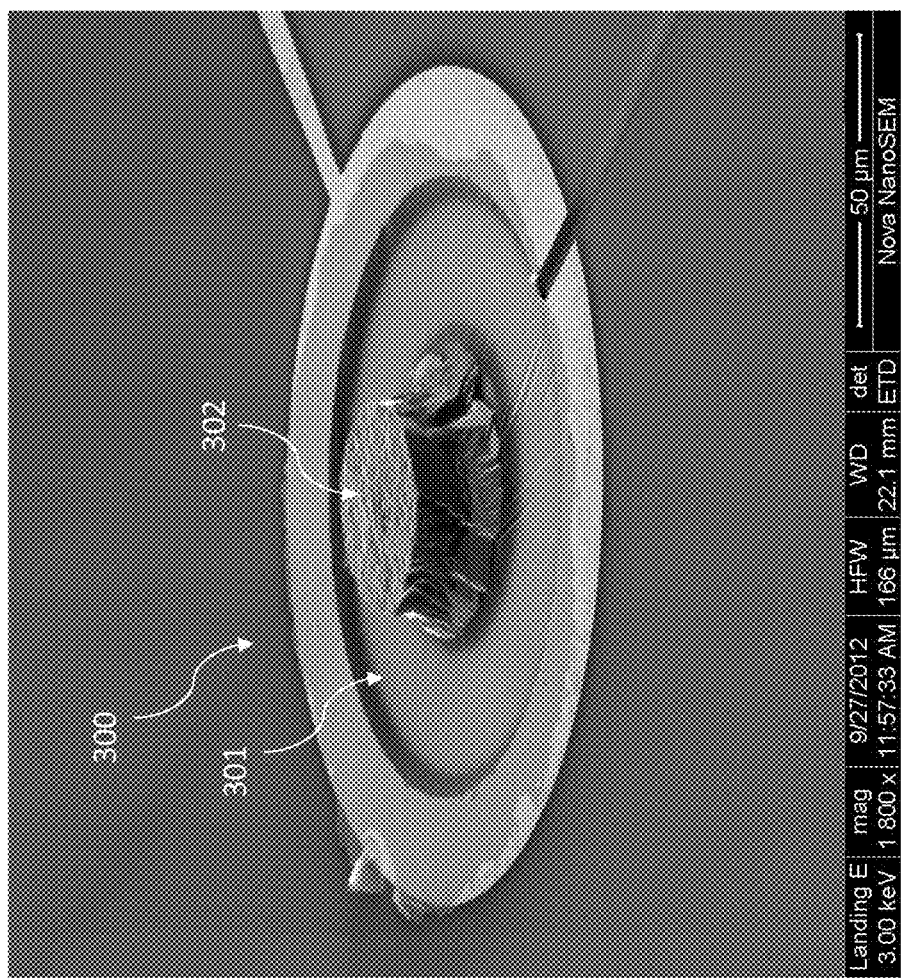
FIG. 3 shows an SEM image of a graphene membrane having a 20 μm tall copper puck, which can be utilized in an embodiment of the present invention.

In embodiments of the present invention, an electrically conductive membrane drum with a patterned material feature is utilized (which is referred herein as a "weighted membrane drum"). FIG. 3 shows a graphene membrane 301 having a 20 μm tall copper puck 302 (that was part of the original graphene growth foil). Like any mass-spring, the weighted membrane drum has a mechanical resonant frequency (that can be on the order of 20 to 100 kHz) and this resonant mode can be excited with an external ultrasonic signal (created by an array of graphene drums, piezoelectric transducers, or other sources of ultrasonic sound). Unlike the embodiments shown in FIG. 1, no power source needs to be utilized (with a trace) to resonate the weighted graphene drum 300 (i.e., this is a passive ultrasonic ID device).

When this ultrasonic sound source is turned off, the weighted graphene drum 300 will continue to resonate for several cycles. This will emit an ultrasonic signal at its resonant frequency (and have a magnitude related to the diameter of the graphene drum 301). This weighted graphene drum ultrasonic signal can be picked up by an ultrasonic microphone (which, optionally, may also use graphene drums or other electrically conductive membrane drums).

As seen in FIG. 3, the copper puck 302 can be etched with irregular features (due to Cu grain boundaries, etc.) and so each graphene drum will have a unique resonant frequency that will be difficult to replicate. A group of several graphene drums will have a frequency and magnitude spectrum that will be nearly impossible to replicate. This ultrasonic signature can be matched to a printed serial number (on a computer chip for example) for ultrahigh security applications.

Because several thousand ultrasonic ID devices can be made on a square centimeter on copper foil, these devices will cost a small fraction of a cent to produce. These devices can be adhered to tape in a little well so they could not be easily damaged and also be easy to apply to any product.

In other embodiments of the present invention, a polyester film (such as Mylar) can be utilized (instead of graphene) in an ultrasonic ID device. Mylar is the trade name for biaxially oriented polyethylene terephthalate ("PET") film. Mylar is the most common thermoplastic polymer resin of the polyester family and is used in fibers for clothing, containers for liquids and foods, thermoforming for manufacturing, and in combination with glass fiber for engineering resins. The properties of PET make in useful in many applications, including flexible food packaging and thermal insulation. Because of its high mechanical strength, PET film is often used in tape applications, such as the carrier for magnetic tape or backing for pressure-sensitive adhesive tapes. Alternatively, other polymer films (such as polyethylene ("PE"), polypropylene ("PP"), polyvinyl chloride ("PVC"), and polydimethylsiloxane ("PDMS")) can be utilized.

Such an embodiment (using polymer films) has advantages in certain applications. The diameter of each polyester film drum can be larger (which increases the ultrasonic signal). The polyester film drum membrane is stiffer (which allows for a higher resonant frequencies even with a larger patterned material feature, such as a metal puck or, alternatively, plastic or thicker Mylar). The decay time can be longer (which is due to higher stiffness of the polyester film membrane and heavier patterned material feature). The polyester membrane is generally cheaper than graphene. And, the stiffness of a polyester membrane (such as Mylar) can be fine tuned with heat (such as from a laser).

Figure 4:
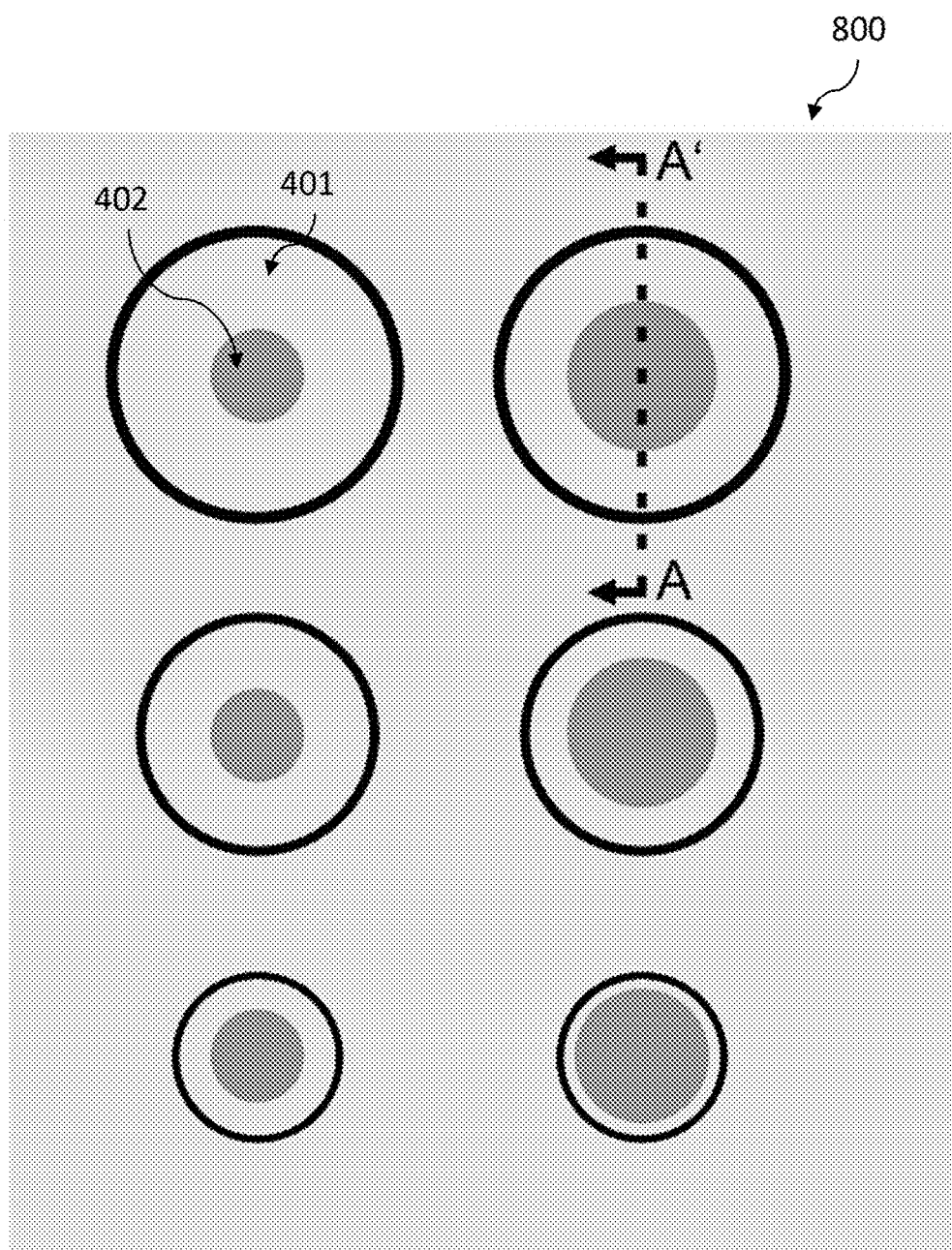
FIG. 4 illustrates an ultrasonic source/reader having six (6) polyester membrane drums.

It is thus possible to dial in near exact resonant frequencies by exciting the polyester membrane drum (either electrically like a membrane switch or with ultrasound) and giving the polyester membrane drum heat doses (with a laser or flash lamp). The laser/lamp can keep dosing the polyester membrane drum with heat until the desired resonant frequency is achieved. Another adjacent polyester membrane drum can then be adjusted in the same way with the laser focused on just this polyester membrane drum. By such a process, an array of polyester membrane drums (such as five (5) polyester membrane drums) can then have a desired (and unique) code. FIG. 4 illustrates a dedicated ultrasonic source/reader 401 having six (6) polyester membrane drums 401 having polyester membranes of different diameters and differing patterned material features 402. The array of six (6) polyester membrane drums 401 can have a diameter of on the order of 1 to 3 mm each. The optional patterned material features 402 on top can be metal, plastic, or thicker Mylar. In some embodiments the membrane itself can serve as the resonant mass. The mechanical resonant frequency of each weighted polyester membrane drum can be adjusted by varying the diameter of the patterned material feature, the thickness of the patterned material feature, the density of the patterned material feature, the thickness of the polyester membrane, and the pre-tension of the polyester membrane (which can be dialed in precisely with heat from a laser while simultaneously measuring the ultrasonic signal emitted from the polyester membrane drum).

Figure 5:
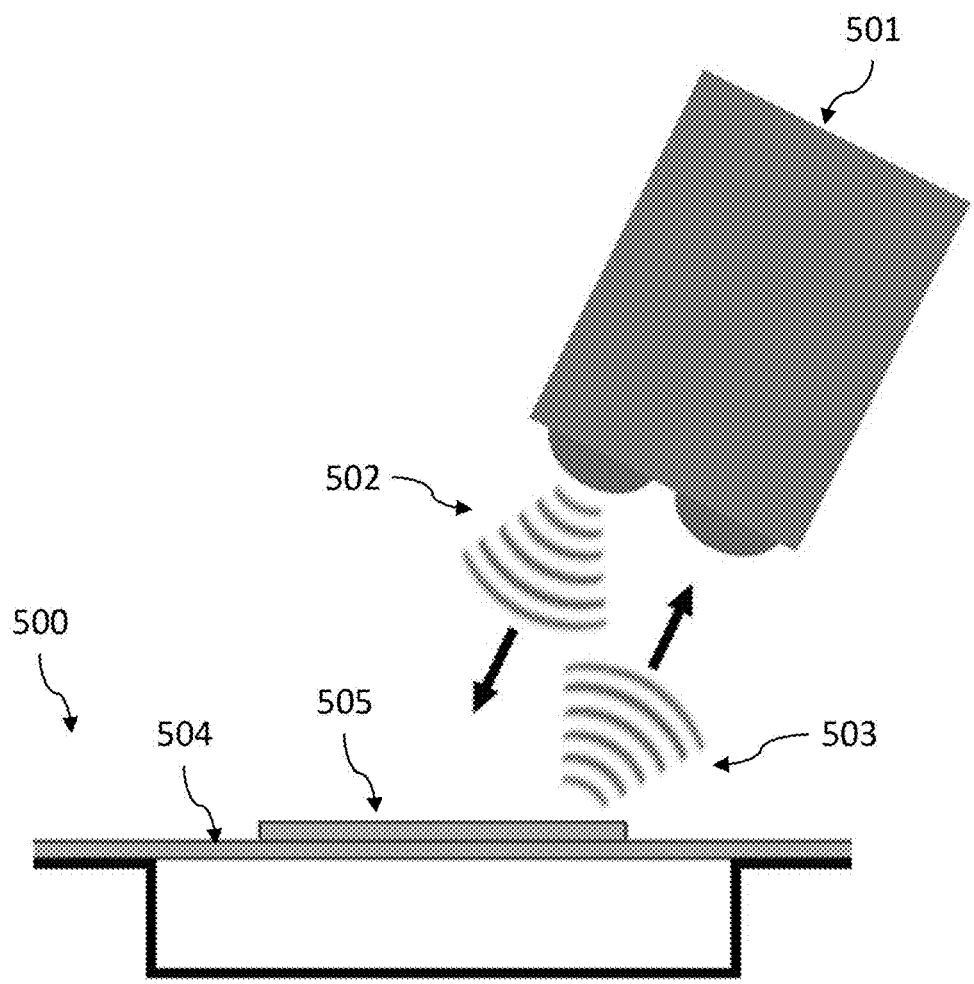
FIG. 5 illustrates a cell phone interacting the ultrasonic/sonic source/reader of FIG. 4.

These weighted polyester membrane drums can then be excited/read with the loudspeaker/microphone from a device, such as a cell phone. FIG. 5 illustrates a cell phone 501 interacting an ultrasonic tag 500 (having polyester membrane drums 504 with material features 505.

For example, consider a shopper looking for a specific size/type of article of clothes (i.e., dress) in a store. The shopper could have an app on her phone that "pings" all the nearby (such as within about 10 meters) polyester membrane devices (shown by waves 502) and reads all the ultrasonic feedback (shown by waves 503). Based on frequency, signal strength and echo return time the software in phone can determine if the given item is in the store (and lead the shopper to it if it is in the store). The app might also have a "buy" option that pulls money from the shopper's bank account (or charges from the shopper's credit/debit card) and allows the shopper to walk out of store with item (without ultrasonic security sensors tripping an alarm).

Such an ultrasonic polyester membrane drum ID device is quite inexpensive. Passive RFID tags are on the order of at least 10 cents each. A polyester membrane drum ID tag can be under one cent (since it does not need an antenna or microchip). A sub-cent device is economically viable on most consumer products (such as a box of cereal).

Furthermore, the membrane of the membrane drum has weight itself that can be controlled. Accordingly, in some embodiments of the present invention, the membrane drum does not have a material feature deposited on the membrane but is still operable to operable to (a) resonate in response to a first ultrasonic sound signal and (b) produce a second ultrasonic sound signal in response.

For instance, an ultrasonic identification device can have a plurality of membrane drums each made of a polyester film. The weight, stiffness, and other physical characteristics of the polyester film membrane drums are varied, such as by changing the diameter of the membrane drum, changing the thickness of the membrane drum, changing the pre-tension of the membrane, treating the membrane drum (i.e., heat doses with a laser or flash lamp), and selectively incorporating additives into the membrane drum, etc.

As with the weighted membrane drums, each of these membrane drums has a mechanical resonant frequency (that can be on the order of 20 to 100 kHz) and this resonant mode can be excited with an external ultrasonic signal (created by an array of graphene drums, piezoelectric transducers, or other sources of ultrasonic sound).

When this ultrasonic sound source is turned off, each of the membrane drums will continue to resonate for several cycles. This will emit an ultrasonic signal at its resonant frequency (and have a magnitude related to the diameter of the membrane drum). This membrane drum ultrasonic signal can be picked up by an ultrasonic microphone (which, optionally, may also use graphene drums or other electrically conductive membrane drums).

By varying the membrane drums in the ultrasonic identification device, the membrane drums will be tunable and able to produce a unique ultrasonic sound signal in response.

A number of embodiments of the invention have been described. Nevertheless, it will be understood that various modifications may be made without departing from the spirit and scope of the invention. Accordingly, other embodiments are within the scope of the following claims.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. An ultrasonic identification device comprising
   (a) a substrate;
   (b) a plurality of membranes located on the substrate, wherein the membranes comprise a substance selected from the group consisting of graphene, graphene oxide, polyester films, polymer films, and combinations thereof, and
   (c) a material feature deposited on one side of each of the membranes in the plurality of membranes to form a plurality of weighted membrane drums, wherein
      (i) the plurality of the weighted membrane drums are operable to resonate in response to a first ultrasonic sound signal, and
      (ii) the resonance of the plurality of the weighted membrane drums is operable to produce a second ultrasonic sound signal.

2. The ultrasonic identification device of claim 1, wherein the substance comprises a polyester film.

3. The ultrasonic identification device of claim 2, wherein the polyester film is polyethylene terephthalate film.

4. The ultrasonic identification device of claim 1, wherein the substance comprises a polymer film comprising a polymer selected from the group consisting of polyethylene terephthalate, polyethylene, polypropylene, polyvinyl chloride, polydimethylsiloxane, and combinations thereof.

5. The ultrasonic identification device of claim 1, wherein the material feature comprises a material selected from the group consisting of metal, plastic, polyester, and a combination thereof.

6. The ultrasonic identification device of claim 5, wherein the material feature comprises metal.

7. The ultrasonic identification device of claim 1, wherein the plurality of weighted membrane drums comprises at least five weighted membrane drums.

8. The ultrasonic identification device of claim 7, wherein the resonance of each of the plurality of weighted membrane drums is operable to produce different membrane ultrasonic sound signals within the second ultrasonic sound signal.

9. The ultrasonic identification device of claim 1, wherein a first weighted membrane drum and a second weighted membrane drum in the plurality of weighted membrane drums are operable to produce different membrane ultrasonic sound signals within the second ultrasonic sound signal due to a characteristic selected from the group consisting of (a) a difference of diameter of the material feature on the first weighted membrane drum and the material feature on the second weighted membrane drum, (b) a difference of thickness of the material feature on the first weighted membrane drum and the material feature on the second weighted membrane drum, (c) a difference of density of the material feature on the first weighted membrane drum and the material feature on the second weighted membrane drum, (d) a difference of thickness of the membrane of the first weighted membrane drum and the membrane of the second weighted membrane drum, (e) a difference in the pre-tension of the membrane of the first weighted membrane drum and the membrane of the second weighted membrane drum, (f) a difference in the diameter of the of the membrane of the first weighted membrane drum and the membrane of the second weighted membrane drum, (g) a difference in the treatment of the membrane of the first weighted membrane drum and the membrane of the second weighted membrane drum, (h) a difference in the additives added to the membrane of the first weighted membrane drum and the membrane of the second weighted membrane drum, and (i) combinations thereof.

\* \* \* \* \*